INVENTOR.
HARRY W. McQUAID
BY
RICHEY, McNENNY & FARRINGTON
ATTORNEYS

United States Patent Office 3,139,335
Patented June 30, 1964

3,139,335
CONTINUOUS IRON ORE REDUCTION
PROCESS AND APPARATUS
Harry W. McQuaid, 1241 Union Commerce Bldg.,
Cleveland, Ohio
Filed Nov. 22, 1960, Ser. No. 71,050
12 Claims. (Cl. 75—40)

The present invention relates to a method and apparatus for melting and reducing metal ores containing iron oxides.

The principal object of this invention is to increase the speed and reduce the cost of converting iron ore into usable metal. This is accomplished by rapidly and continuously melting iron ore and removing the contained oxygen from the molten ore with carbon to produce a high carbon molten iron similar to "hot metal," pig iron, or cast iron. The molten metal so produced may then be processed through any desired refining operations to produce the desired iron or steel end product.

Blast furnaces are extremely large and costly and their reactions proceed at a relatively slow rate. The ore, coal, and limestone move downwardly counter-current to the hot gases, and the reduction of the iron oxides takes place in the upper relatively low temperature portions by reaction of CO gas with the oxides in the solid phase. The reduced spongy iron absorbs sufficient carbon to become liquid as it moves down into higher temperature zones and finally percolates to the hearth. The reactions themselves proceed very rapidly at the surfaces of the reagents in contact, but the relatively slow rate of the overall process in a blast furnace is the result of the slow rate at which surfaces of the solid iron oxide can be exposed to the reactive gases.

The principal feature of this invention is to obtain with extreme rapidity surface contact between the iron oxides and the reducing reagents, with the result that only a few minutes elapse between the time a particular particle of ore enters the charging end of the apparatus until the molten metal from that particular particle of ore emerges from the discharge end of the reducing apparatus.

According to this invention iron ore mixed with carbon, such as pulverized coal or coke, is introduced directly into a high temperature flame so as to melt the surface of the ore and react the molten ore with the carbon, and with the carbon monoxide thereby produced, reducing the molten iron oxides to molten iron with great rapidity. The ore and carbon mixture is preferebly pelletized to facilitate handling and is fed into the high temperature flame in a relatively thin continuously moving sheet to obtain the maximum surface exposed to the flame in proportion to the mass. Powdered limestone or the like may also be introduced with the ore and the carbon to assist the gangue of the ore in fluxing the molten ore and the molten metal, and to neutralize the silicon in the gangue.

The molten ore and carbon mixture is caused to flow continuously through the remaining length of the heating zone in a thin wide stream providing the maximum surface contact between the unreduced iron oxides, the carbon particles entrained with the molten ore and the carbon monoxide gas passing over the thin stream of molten ore. As the iron is reduced it absorbs carbon and flows along the hearth bottom, the thin layer of molten ore floating on top of the iron and maintaining the maximum possible surface contact between the unreduced iron oxides and the reagents. The molten reduced ore may be withdrawn from the melting unit and delivered directly to a mixer, open hearth furnace, Bessemer converter, or electric furnace for any desired refining operations, or may be cast into pigs for subsequent use. When desired the molten iron may first be introduced into a reactor with suitable reagents such as iron oxide or oxygen to oxidize and remove silicon and manganese and an alkaline material such as caustic soda, soda ash, or lime to reduce the sulphur content of the molten metal before being delivered to an open hearth furnace, electric furnace, or converter for the final shaping up and adjustment of the carbon content.

The present invention also includes a novel ore melting and reducing unit comprising a curved hearth bottom extending steeply downwardly from the charging end and curving to a more gradual slope under an oscillating burner unit and continuing substantially horizontally under a second burner unit producing lower temperature flames and through an open notch at the bottom of a stack which draws off the products of combustion and reaction. The iron ore mixed with coal dust and powdered limestone is continuously fed into and spread over the steeply sloping entrance portion of the hearth bottom, which is arranged at a steep enough angle so that the solid materials slide downwardly. The slope of the hearth bottom decreases and reaches the angle of repose of the solid materials being charged at a point under the central part of the oscillating high temperature burner unit. Through the remainder of the high temperature zone the downward slope of the bottom is insufficient to allow further sliding of the solid material, but is sufficient to insure rapid run-off of the molten ore, slag, and iron to maintain the molten ore in a thin mobile stream providing maximum surface contact with the reducing reagents. Below the low temperature burner unit the bottom is arranged substantially horizontally so that the molten metal and slag flow smoothly out through the exit notch in a thin, continuous molten stream. The substantially horizontal portion allows sufficient time for substantially all of the iron oxides to be reduced. The stack at the exit end of the furnace provides sufficient draft to insure that the products of combustion and reaction are drawn through the furnace in the same direction in which the solid material and the molten material flow along the hearth. Preferably the stack passes through a carbon monoxide collector to save the large quantity of carbon monoxide created by the reaction between the carbon and the iron oxides. Carbon monoxide collected from the stack may be used as fuel in the second or low temperature burner unit.

Other objects and advantages of the present invention will appear from the following detailed description of preferred embodiments.

Figure 2:
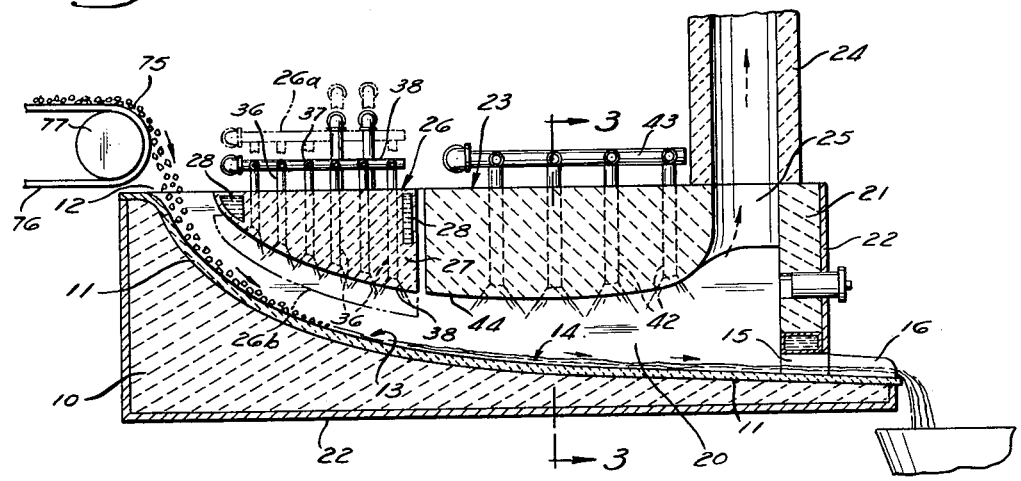
FIG. 2 is a vertical longitudinal section through the unit taken on the plane indicated by the line 2—2 of FIG. 1.

Referring to the drawings, the ore melting and reducing unit comprises a hearth 10 built of a suitable refractory such as firebrick. The hearth bottom wall is formed of a layer 11, a few inches thick, of high duty refractory, such as magnesite or special refractory. At the charging end 12 the hearth bottom rises to the top of the melting unit and descends steeply downward, with decreasing slope, to a point indicated at 13 in FIG. 2, at which the angle of slope of the bottom 11 becomes less than the angle of repose of the granulated solid materials to be charged into the furnace. From point 13 the bottom continues to slope downwardly with decreasing angle of slope to a point indicated at 14 in FIG. 2, from which the bottom continues with a slight slope through the notch 15 and onto the discharge spout 16.

The melting unit also includes substantially vertical side walls 20 built of firebrick or other suitable refractory and a substantially vertical end wall 21. The refractory side walls, end wall and hearth may be surrounded and supported by any suitable framework as indicated diagrammatically at 22 which may be of metal and provided with water cooling where necessary. Adjacent the charging end 12 the top of the melting unit is open between the side walls and adjacent the discharge end of the unit the hearth is roofed over by a fixed burner assembly 23. A stack 24 rises from the upper surface of the fixed burner assembly 23 and the end wall 21 and communicates with the space above the hearth through an opening 25 in the assembly 23.

Figure 1:
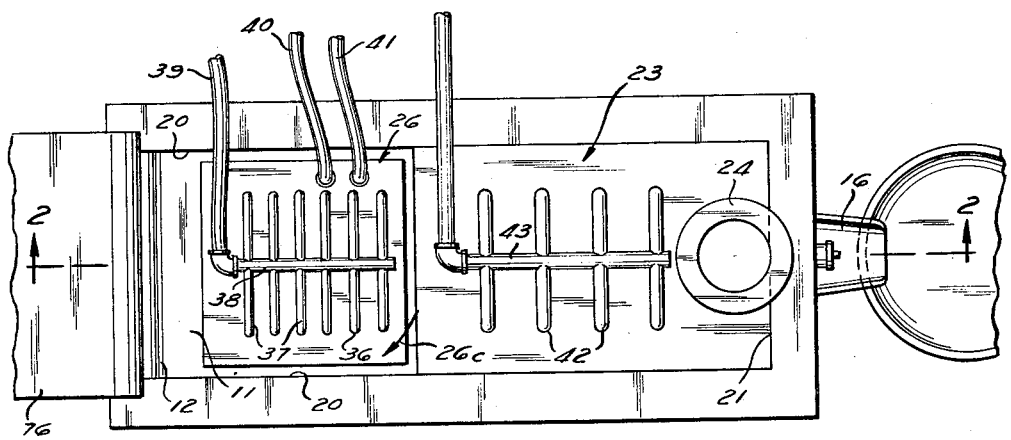
FIG. 1 is a diagrammatic top plan view of an ore melting and reducing unit according to the present invention.
Figure 3:
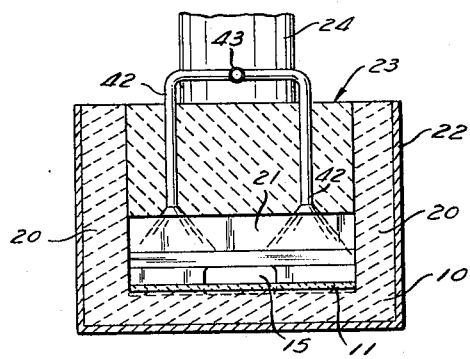
FIG. 3 is a partial cross-sectional view taken on the line 3—3 of FIG. 1 looking in the direction of the arrows.

In the preferred embodiment a high temperature burner assembly 26 is supported above the hearth 10 at the charging end 12. As illustrated the assembly 26 is composed of refractory 27 supported and enclosed by a water-cooled metallic framework 28. In the embodiment illustrated diagrammatically the burner assembly 26 is indicated as being mounted for vertical adjustment as indicated by the dotted lines 26a and 26b in FIG. 2 to permit selection of the most effective position of the burner unit with respect to the upper surface of the charge. The burner unit 26 may also be mounted for oscillation as indicated by the circular arrow 26c in FIG. 1 to distribute the flames over the surface of the charge and avoid burning holes through the charge.

The lower surface of the movable burner assembly 26 is curved downwardly from adjacent the charging end 12 of the melting unit and extends generally parallel to the hearth bottom 11. A plurality of rows of burners 36 extend downwardly through the assembly 26 being connected at their upper ends of a plurality of transverse feeder pipes 37 which in turn are connected to a main header 38. The header 38 is connected in any suitable way as by a flexible hose 39 to a source of fuel such as natural gas or oil. It will be understood that the burners and supply pipes are indicated only diagrammatically and any suitable type of burner and connections to the supply of fuel and air or oxygen for combustion may be used. The water jacket 28 of the movable burner assembly 26 is also indicated as connected to water inlet and return lines by flexible hoses 40 and 41. The fixed burner assembly 23 is also provided with a plurality of burners 42 extending downwardly therethrough and connected to suitable feeders or headers 43 for the supply of fuel and air or oxygen for combustion.

The under-surface 44 of the fixed burner assembly 23 at its forward end is positioned adjacent the under-surface 38 of the movable burner assembly 26. The under-surface 44 of the fixed assembly 23 curves upwardly and rearwardly from the hearth bottom 11 providing an increased space and consequently lower velocity for the gases moving over the rearward portion of the hearth bottom. At its rearward end the under-surface 44 curves upwardly into the opening 25 which communicates with the stack 24.

For carrying out the process of this invention the burners 36 in the movable high temperature burner unit 26 are supplied with suitable fuel such as natural gas or oil and a mixture of air and oxygen as necessary to provide high temperature flames. The combustible mixture is supplied under pressure and the burners are preferably directed downwardly to produce high temperature blasts against the surface of the charge on the hearth bottom 11. Preferably the rows of burners and the burners in each row are closely spaced and the unit 26 is oscillated so that the flames are distributed over the entire area of the hearth bottom 11 beneath the burner unit 26.

The charge is preferably pelletized and consists of concentrated iron ore evenly mixed with from about 10% to about 40% by weight of pulverized coal. Alternatively the granular charge may be ore crushed and screened to corresponding size granules evenly mixed with from about 10% to about 40% by weight of pulverized coal. Coking grade of coal is not required and any form of coal may be used, the quantity being varied in accordance with the carbon content. In either event the granular material is fed, preferably in unheated condition, or at ambient temperature, into the charging end 12 of the melting unit in the form of a thin stream spread uniformly over the hearth bottom 11. This may be done as illustrated in the drawings by distributing the ore and coal mixture 75 uniformly across a conveyer belt 76 which passes around a roller 77 and dumps the material into the charging end 12. A relatively small quantity of powdered fusible alkaline material, such as limestone, soda ash or caustic soda may also be mixed with the charge to assist in fluxing.

The slope of the hearth bottom 11 from the charging end 12 to about the point marked 13 is sufficient to cause the solid granular material 75 to slide or roll downwardly in a thin sheet as delivered from the conveyer into the high temperature zone beneath the burner unit 26. Preferably sufficient oxygen is supplied to the burners 36 to maintain the downwardly directed blast of flames beneath the burner unit 26 at a temperature of 3200° F. or higher. Thus the charge is rapidly heated as it flows downwardly along the hearth bottom 11 and before the solid material has reached the point 13 the upper surfaces of the pellets or granules of ore have begun to melt. The high temperature flame causes the melting to proceed rapidly so that beyond the point where the hearth bottom reaches the angle of repose of the solid material the molten ore and metal flow rapidly in a thin stream toward the exit notch 15.

The slope of the hearth bottom at and in advance of the point 13 is thus sufficiently steep and shaped to insure rapid drainage or run-off of the molten material. This avoids one of the principal problems heretofore encountered in attempts to melt iron ore since the ore tends to sinter or frit when it reaches a temperature in the neighborhood of 2000° F. so that the particles tend to stick together and form a solid mass. Such a mass prevents relative movement between the particles of iron ore and the carbon, reducing the contacting surfaces at which reactions can occur, and also tends to retard the melting by reducing the surfaces exposed to the flames. In the present process reduced molten iron and melted ore drain and run rapidly from the solid material, exposing new surfaces to the flames and removing any support for the leading edge of the sintered material so that it quickly crumbles and melts, aided by the pressure and the rolling of additional material being charged into the furnace.

The reducing reactions begin as soon as the charge slides or rolls downwardly along the hearth bottom 11 and reaches a temperature of about 940° F. At and above this temperature the carbon provided by the powdered coal mixed with the ore begins to react with the iron oxides according to the following reaction:

$$3Fe_2O_3 + C = 2Fe_3O_4 + CO$$
$$Fe_3O_4 + C = 3FeO + CO$$
$$FeO + C = Fe + CO$$

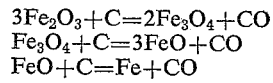

Each of these reactions is strongly endothermic but the intense heat provided by the high temperature blast of flames from the burner unit 26 is sufficient to sustain the reactions while rapidly raising the temperature of the main body of unreduced ore. The layer of granular ore and carbon mixture being charged into the furnace and sliding along the hearth bottom 11 and the above endothermic reactions protect the hearth bottom 11 from overheating.

Some of the carbon monoxide produced by the above reactions between the ore in the solid state and the carbon rises through the granular material and reacts with additional oxides, and the remainder joins the stream of gases passing to the stack 24. The reaction between the carbon monoxide and the iron oxides is exothermic and assists in heating up the surface of the moving layer of solid material. At temperatures below 1292° F. the reduction of $Fe_2O_3$ may take place in three steps, first to $Fe_3O_4$, then FeO, and finally to Fe, $CO_2$ being liberated in each step. At slightly higher temperatures the reaction proceeds $$3CO + Fe_2O_3 = 2Fe + 3CO_2$$

Any of the presently used iron oxide ores may be employed in the present process. The hematite group of ores, the principal commercial ores, contain $Fe_2O_3$; the magnetite group $Fe_3O_4$; and calcined ores of the carbonate group FeO. Some quantities of the other oxides may be included in each group.

The melting points of the oxides of iron in their pure state are: FeO, 2588° F.; $Fe_3O_4$, 2800° F.; $Fe_2O_3$, 2849° F. The iron ores, however, do not consist of pure oxides, but also include in the gangue silica, alumina, lime and magnesia. These compounds, together with the alkaline fluxing material included in the charge, act to reduce the temperature at which the ore melts. Thus some part of the ore starts to melt at about 2250° F., and the most refractory particles melt by the time they have reached a temperature of about 2800° F. The reduced iron which has dissolved 4.3% of carbon begins to melt at a temperature of 2066° F.

Thus as the charge moves down the hearth bottom 11 and before reaching the point 13 streams of molten iron and molten ore have been formed. The most refractory particles or portions of the charge which remain in the solid state up to about the point 13 continue to absorb heat from the high temperature flames and melt at a temperature of about 2800° F. so that all of the material is liquid beyond about the point 13. Thus beyond the point 13 the molten ore flows in a stream towards the discharge notch 15, floating on the surface of the stream of molten metal. In this portion of the furnace the remainder of the solid carbon particles are entrained in the molten ore and the slag, and the solid carbon continues to react with and reduce the molten ore according to the equations given above. As the iron is reduced it absorbs and dissolves carbon and sinks to the bottom of the flowing stream. Since the ore itself is now in the liquid phase, and the reduced iron separates because of its greater weight, the entrained carbon particles are maintained in substantially constant surface contact with molten iron oxide, and large quantities of ore are reduced very rapidly. The carbon monoxide produced tends to bubble through and agitate the molten ore and continue the reduction by the carbon monoxide reaction. Beyond the point in the melting unit where all of the material has become liquid there is a sharp decrease in the amount of heat that must be added, since it is no longer necessary to supply the heat of fusion of the solid material, and it is necessary to reduce the temperature of the iron reduced from that portion of the ore which was heated above about 2500° F. before it melted. This reduction in temperature occurs when the iron reduced from the last melting portion of the ore mingles with the iron reduced at a lower temperature which was allowed to run rapidly out of the hgih temperature heating zone. Thus the fixed burner unit 23 is provided with a smaller number of burners and a much less intense blast. The fuel supply to the burners 42 may be CO mixed with atmospheric air enriched with a small amount of oxygen. The burners 42 in the fixed burner unit 23 are adjusted to provide sufficient heat to maintain the temperature of the molten metal at not more than about 2500° F. as it leaves the discharge notch 15, in addition to supplying the heat required by the endothermic reaction between the molten iron oxides and the entrained carbon particles. Part of the carbon monoxide produced by this reaction reduces additional ore in bubbling through the molten stream of ore and in passing over the upper surface of the molten stream. The remainder of the carbon monoxide passes up the stack 24 with the products of combustion from the two burner units. Sufficient carbon monoxide to supply the heat required to be produced by the burners 42 can be obtained by separating the carbon monoxide from the gases passing through the stack 24.

The molten iron produced by the initial solid phase reduction of the ore before the ore itself becomes molten forms a stream along the hearth bottom 11 on which the molten ore floats and prevents the molten ore from contacting the refractory of the hearth bottom 11 thereby avoiding the corrosive reaction which would otherwise occur between the molten ore and the refractory.

By the time the molten stream reaches the discharge notch 15 substantially all of the molten iron ore has been reduced so that molten iron containing from about 2% up to about 4% of dissolved carbon, and slag which may include a small quantity of unreduced iron oxides, is discharged through the spout 16.

It is preferred to maintain the burners 42 regulated so that the temperature of the molten stream does not exceed about 2500° F. and in any event is kept well below 2700° F. when it is desired to minimize in the melting unit any reaction between the carbon dissolved in the iron and the molten ore.

While preferred embodiments of the present invention have been described in considerable detail it will be understood that many variations and modifications may be made in the method and in the apparatus without departing from the scope of the invention as defined in the following claims.

What is claimed is:

1. A process of reducing metal ores containing iron oxides comprising feeding a mixture of granular ore and pulverized coal onto a downwardly sloping hearth in a high temperature heating zone, supplying fuel to burners opposite said sloping hearth and continuously producing a flame by the combustion of the fuel supplied to said burners, said flame adding heat to the mixture to raise its temperature above the melting point of the ore to produce a stream of molten ore mixed with coal floating on molten metal with dissolved carbon and flowing down the sloping hearth away from the unmelted mixture, the addition of heat in said high temperature zone being at a rate sufficiently great to cause melting of a substantial portion of the ore fed into the sloping hearth, continuing to add heat to the mixture of molten ore and coal to reduce the molten ore by reaction with the carbon of the coal and with the carbon monoxide thereby produced, and flowing the stream of molten metal out of the said heating zone.

2. A process of reducing iron ore comprising continuously feeding a mixture of granular iron ore and carbon onto a downwardly sloping hearth in a high temperature heating zone, supplying fuel and oxygen to burners opposite said hearth and continuously producing an oxygen enriched flame by the combustion of said fuel with said oxygen supplied to said burners, said flame having a temperature of at least about 3200° F., continuously directing said flame toward said ore thereby adding heat to the mixture to raise its temperature above the melting point of the ore, thereby first producing molten iron with dissolved carbon by reaction of the solid ore with the carbon and with the carbon monoxide thereby produced and then producing molten ore mixed with carbon, the addition of heat in said high temperature zone being at a sufficient rate to produce melting of a substantial portion of the ore, flowing the molten material down the sloping hearth away from the solid material, continuing to add heat to reduce the molten ore by reaction with the carbon and with the carbon monoxide thereby produced, and continuously flowing the stream of reduced molten ore out of the said heating zone.

3. A process of reducing iron ore comprising continuously feeding a mixture of granular iron ore and carbon in one direction into a high temperature heating zone, supplying fuel to burners in said high temperature heating zone and continuously producing a flame by the combustion of fuel supplied to said burners, said flame having a temperature of at least about 3200° F., continuously directing said flame toward said ore thereby adding heat to the mixture to raise its temperature above the melting point of the ore, thereby first producing molten iron by reacting the iron ore in the solid phase with the carbon and with the carbon monoxide thereby produced and then producing molten ore mixed with carbon floating upon the molten iron, the addition of heat in said high temperature zone being sufficiently rapid to produce melting of a substantial portion of the ore passing through said high temperature heating zone, flowing the molten material in a continuous stream away from the solid material, continuing to add heat to the mixture of molten ore and carbon to reduce the ore in the liquid phase by reaction with the carbon and with the carbon monoxide thereby produced, and continuously flowing the stream of molten iron out of the said heating zone.

4. A process of reducing metal ore containing iron oxides, comprising mixing such ore with pulverized coal to form a mixture having from about 10% to about 40% by weight of coal, continuously feeding such mixture in granular form onto a downwardly sloping hearth in a high temperature heating zone, supplying fuel to burners and continuously producing a flame by the combustion of the fuel supplied to said burners, continuously directing said flame against the upper surface of the mixture along a length of said hearth, raising the temperature of the mixture above the melting point of the ore to produce a stream of molten ore mixed with coal floating on molten metal with dissolved carbon and flowing down the sloping hearth away from the unmelted mixture, said flames directed against the upper surface of the mixture providing sufficient heat to melt a substantial portion of the ore, directing additional flames toward the upper surface of said stream, reducing the molten ore by reaction with the carbon of the coal and with the carbon monoxide thereby produced, flowing the hot gases produced by said flames and said reaction in the same direction as said molten stream and in contact with the upper surface thereof, flowing the stream of molten metal out of said heating zone, and regulating said flames to maintain the temperature of the molten metal below about 2700° F.

5. A process of reducing iron ore comprising feeding a mixture of granular iron ore and carbon continuously into a high temperature heating zone, said mixture including about 10% to about 40% by weight of carbon, supplying fuel to burners in said high temperature zone and continuously producing a flame by the combustion of the fuel supplied to said burners, said flame continuously adding heat to the mixture, reducing part of this ore in the solid phase by reaction with carbon, raising the temperature of the remainder of the ore to about 2800° F., melting all of the unreduced ore and producing a stream of molten ore mixed with carbon floating upon molten iron, continuing to add heat to the molten stream to reduce the molten ore by reaction with the carbon and with the carbon monoxide thereby produced, while maintaining the temperature of the molten iron below about 2700° F., and flowing the stream of reduced molten iron out of the said heating zone.

6. A process of making steel comprising mixing pulverized coal with iron ore comprising iron oxides and gangue to make a mixture consisting of from about 10% to about 40% by weight of coal, continuously feeding the mixture at ambient temperature directly into a high temperature heating zone, supplying fuel to burners in said high temperature zone and continuously producing a flame by the combustion of the fuel supplied to said burners, continuously directing said flame against the upper surface of the mixture, raising its temperature above the melting point of the ore melting a substantial portion of the ore and producing a stream of molten ore mixed with pulverized coal, reducing the molten ore by reaction with the carbon of the coal and with the carbon monoxide thereby produced, flowing the stream of reduced molten ore and the hot gases produced by said flames and said reaction in the same direction through said heating zone, and flowing the resulting molten metal out of the said heating zone.

7. Apparatus for reducing ore comprising a furnace having a charging end and an exit end, said furnace having a hearth bottom extending steeply downwardly from the charging end and extending with a smooth continuous curve into a substantially horizontal bottom portion adjacent the exit end, means for introducing a mixture of granular ore and carbon into the charging end of said furnace, said furnace including burners positioned above said hearth bottom arranged to impart heat to the charged material from a point near the charging end to a point near the exit end, said hearth bottom at the charging end having a downward slope exceeding the angle of repose of the mixture being charged, a stack for withdrawing products of combustion and reaction from said furnace adjacent the exit end thereof and a discharge notch which is opened continuously for flowing molten material out of said furnace at the exit end thereof, said discharge notch being located substantially below the upper end of said continuous curve, said apparatus being substantially free of obstructions between said notch and curve whereby substantial depths of molten material is prevented from building up along said curve.

8. Apparatus for reducing ore comprising a furnace having a charging end and an exit end, said furnace having a hearth bottom extending steeply downwardly from the charging end and extending with a smooth continuous curve into a substantially horizontal bottom portion adjacent the exit end, means for introducing granular ore and carbon into the charging end of said furnace, said furnace including burners positioned above said hearth bottom arranged to direct flames downwardly onto the charged material from a point near the charging end to a point near the exit end, said hearth bottom from the charging end to an intermediate point having a downward slope exceeding the angle of repose of the mixture being charged, said burners between the charging end and said intermediate point being arranged to impart more heat to the charged material than the burners between said intermediate point and the exit end, a stack for withdrawing products of combustion and reaction from said furnace adjacent the exit end thereof and a discharge notch which is continuously open for flowing molten material out of said furnace at the exit end thereof, said discharge notch being substantially level with the lower end of said curve, said apparatus being free of substantial obstructions between said notch and curve whereby substantial depths of molten material are prevented from building up along said curve.

9. A process of reducing iron ore comprising continuously feeding a mixture of granular iron ore and carbon at ambient temperature directly into a high temperature heating zone, said mixture including about 10% to about 40% by weight of carbon, supplying fuel to burners in said high temperature zone and continuously producing a flame by the combustion of the fuel supplied to said burners, said continuous flame adding heat to the mixture, reducing part of this ore in the solid phase by reaction with carbon, raising the temperature of the remainder of the ore to about 2800° F., melting all of the unreduced ore and producing a stream of molten ore mixed with carbon floating upon molten iron, continuing to add heat to the molten stream to reduce the molten ore by reaction with the carbon and with the carbon monoxide thereby produced, while maintaining the temperature of the molten iron below about 2500° F., and flowing the stream of reduced molten iron out of the said heating zone.

10. A process of reducing iron ore comprising continuously feeding a mixture of granular iron ore and carbon at ambient temperature directly into a high temperature heating zone, supplying fuel to burners in said high temperature heating zone and continuously producing a flame by the combustion of the fuel supplied to said burners, said continuous flame adding heat to the mixture, reducing part of this ore in the solid state phase by reaction with carbon, raising the temperature of the remainder of the ore to about 2800° F., melting all of the unreduced ore and producing a stream of molten ore mixed with carbon floating upon molten iron, continuing to add heat to the molten stream to reduce the molten ore by reaction with the carbon and with the carbon monoxide thereby produced, while maintaining the temperature of the molten iron below about 2500° F., and flowing the stream of reduced molten iron out of the heating zone.

11. A process of reducing metal ores containing iron oxides comprising feeding a mixture of granular ore and pulverized coal onto a downwardly sloping hearth in a high temperature heating zone, supplying fuel and oxygen to burners opposite said hearth and continuously producing an oxygen enriched flame by the combustion of said fuel with said oxygen supplied to said burners, continuously directing said oxygen enriched flame toward the surface of such mixture at a temperature of at least about 3200° F. thereby adding heat to the mixture to raise its temperature above the melting point of the ore to produce a stream of molten ore mixed with coal floating on molten metal with dissolved carbon and flowing such stream down the sloping hearth away from the unmelted mixture.

12. A continuous process of reducing metal ores containing iron oxide comprising feeding a mixture of granular ore and carbon onto a downwardly sloping hearth in a high temperature heating zone, directing a continuous flame through a nozzle produced by combustion of fuel supplied through such nozzles toward the face of said ore wherein said flame has a temperature sufficiently high to produce relatively rapid melting of the ore thereby producing molten iron with dissolved carbon by reaction of solid ore with the carbon and with the carbon monoxide thereby produced and then producing molten ore mixed with carbon, the combustion of the fuel supplied through said nozzles providing substantially all of the heat required to melt the ore, flowing the molten material down the sloping hearth away from the solid material, continuing to add heat to reduce the molten ore by reaction with the carbon and with the carbon monoxide thereby produced, and continuously flowing the stream of reduced molten ore out of said heating zone.

References Cited in the file of this patent

UNITED STATES PATENTS 791,577     Riveroll _____ June 6, 1905

FOREIGN PATENTS 367,346     Great Britain _____ Feb. 11, 1932